Jan. 22, 1929.  
G. W. MANN  
1,699,600  
FLUID PRESSURE BAG  
Filed Feb. 17, 1926

INVENTOR.
BY Guy W. Mann
ATTORNEY.

Patented Jan. 22, 1929.

1,699,600

UNITED STATES PATENT OFFICE.

GUY W. MANN, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

FLUID-PRESSURE BAG.

Application filed February 17, 1926. Serial No. 88,816.

This invention relates to annular bags for vulcanizing tire casings under internal fluid pressure. It is the object of the invention to improve upon prior bags in various particulars which will more fully appear hereafter.

It has previously been customary to form vulcanizing bags with a relatively heavy hollow rubber body portion, shaped to conform to the interior of the tire cavity. The base portion of such bags has generally been reinforced with a strip of bias-cut woven fabric extending up a short distance on the side of the bag. Bags so constructed have been found very liable to crack on their inner periphery when being folded in order to insert them in or remove them from a tire casing. Furthermore, in order to get the necessary stiffness to resist the pinching pressure of the vulcanizing molds in closing, it has been necessary to use several plies of fabric. According to my invention I increase the circumferential flexibility of the bag, reduce the amount of fabric necessary to be used in the reinforcement, and produce a bag which will adjust itself much more quickly to the cavity of a tire casing after having been folded up in order to be inserted therein. These objects I accomplish by making a reinforcement of a material which will stretch circumferentially but will resist transverse strain to a high degree. Suitable material for this purpose is straight cut cord fabric; that is, sheet material formed of a plurality of parallel cords held in place by a matrix of rubber coupled in some cases with fine and widely spaced filler threads. The use of this material has further advantage in facilitating the dispersion of air entrapped between the bag and tire casing as will more fully appear below.

Referring to the drawings.

Figure 1:
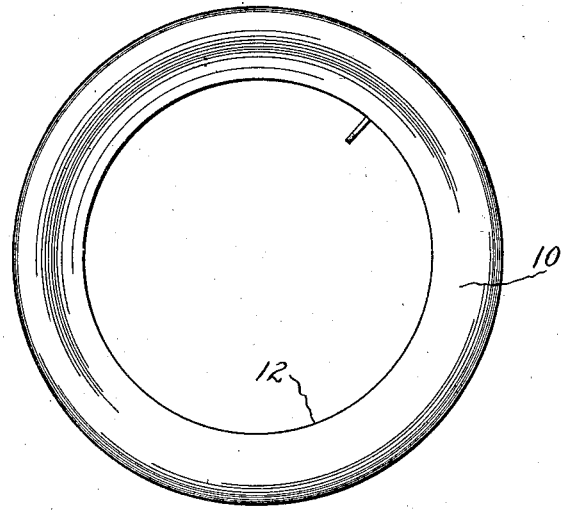
Fig. 1 is a side elevation of a bag embodying my improvement.
Figures 2, 3:
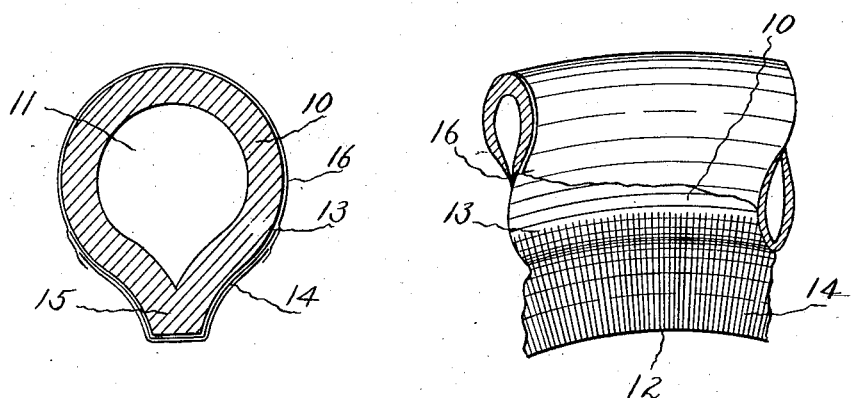
Fig. 2 is a transverse section through such a bag.
Fig. 3 is an enlarged side elevation showing the preferred form of reinforcement.

In the form of the invention shown in the drawings, 10 represents the rubber body portion of the annular bag which is, as is customary, provided with an internal cavity 11. Extending across the inner periphery 12 of the bag and up to points 13 at the sides, I have arranged cords 14, preferably in two layers and conveniently applied in the form of a cord fabric. These cord layers are preferably covered at their edges by a layer of rubber 16 extending over the outer surface of the bag. When the bag is vulcanized to prepare it for use these cords are vulcanized to form an integral part of the rubber body portion. The cords are highly resistant to transverse strain, but on account of the lack of connection between them in a direction circumferentially of the bag they do not destroy the flexibility of the base portion 15 of the bag. A bag so constructed can be folded up into much smaller compass without injury than bags constructed according to prior practice. Furthermore, the use of cords in the manner described produces a slightly corrugated surface which allows distribution and dispersion of any air which may be trapped between the bag and the tire casing, and which would otherwise produce defects in the bag and in casings cured on it.

Having thus described my invention, I claim:

An annular bag for vulcanizing tire casings under internal fluid pressure which comprises an annular hollow rubber body portion generally circular in cross-section but having its inner circumference shaped to fit between the bead portions of a tire casing, and a localized reinforcement of cords extending across the inner circumference of the bag and a short distance only up the sides, the cords lying substantially in planes passing through the axis of the bag and being held integrally in the sides of the bag throughout their lengths by vulcanization of the rubber thereof so as to resist transverse displacement in either direction.

GUY W. MANN.